June 1, 1965 P. SMALLER 3,187,111

MAGNETIC RECORDING HEADS WITH MONITOR OF RECORDED SIGNAL

Filed Jan. 23, 1961 3 Sheets-Sheet 1

PHILIP SMALLER
INVENTOR.

BY Nathan N. Kallman

ATTORNEY

June 1, 1965 P. SMALLER 3,187,111

MAGNETIC RECORDING HEADS WITH MONITOR OF RECORDED SIGNAL

Filed Jan. 23, 1961 3 Sheets-Sheet 2

PHILIP SMALLER
INVENTOR.

BY Nathan N. Kallman

ATTORNEY

PHILIP SMALLER
INVENTOR.

BY Nathan N. Kallman

ATTORNEY 3,187,111

MAGNETIC RECORDING HEADS WITH MONITOR OF RECORDED SIGNAL

Philip Smaller, Portola Valley, Calif., assignor to Ampex Corporation, Redwood City, Calif., a corporation of California Filed Jan. 23, 1961, Ser. No. 84,429
7 Claims. (Cl. 179—100.2)

Figure 1:
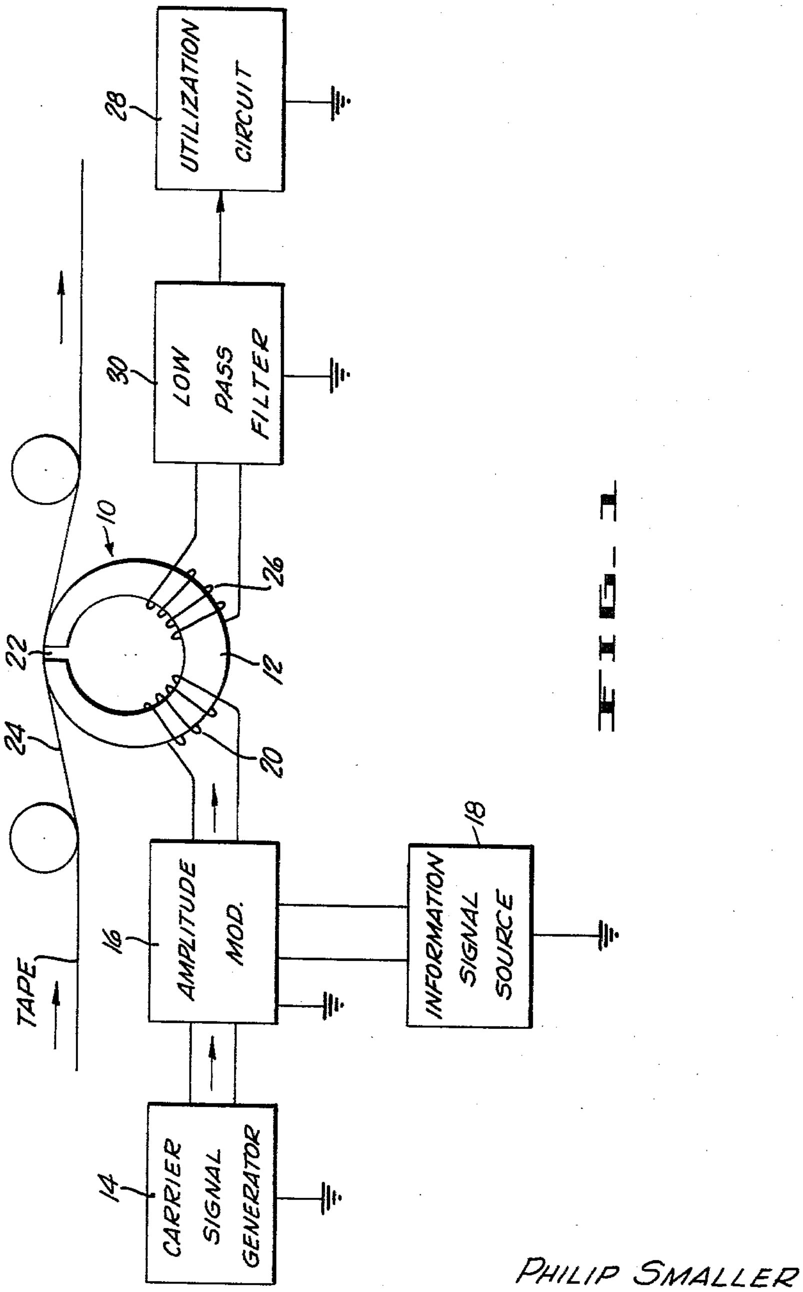

This invention relates to magnetic recording and reproducing and, in particular, to magnetic tape recording and reproducing systems wherein a signal that is being recorded may be reproduced substantially simultaneously with the recording of such signal.

In many applications of magnetic tape apparatus, such as utilized with computers and instrumentation devices, it is desirable and often necessary to determine instantaneously whether an information signal is being correctly recorded, if at all. If the recording operation is erratic, there may be a loss of extensive signal information that would not be available again.

In presently known recording systems, while an information signal is being recorded on a storage medium or magnetic tape, it is generally necessary to wait for the medium or the tape to be moved away from the recording area or transducing gap before playback may be effected. However, it would be advantageous to be able to record an information signal and to reproduce such information signal substantially simultaneously with the recording.

In one type of prior art recording system, a magnetic medium may be first magnetized or magnetically saturated to serve as a nonlinear detector for demodulating an amplitude modulated high frequency carrier signal. One such magnetic recording system is described in U.S. Patent No. 1,886,616 which is directed particularly to an audio frequency recording system. In the system described, the saturated medium demodulates the carrier wave and records the amplitude modulating signal only. It is proposed herein to employ an amplitude modulated high frequency carrier signal in conjunction with a magnetized storage medium in a similar manner for recording and storing the amplitude modulating or information signal, and in addition concurrently reproducing the recorded information signal only.

An object of this invention is to provide a recording system wherein a recorded signal may be instantaneously reproduced during recording.

Another object of this invention is to provide a magnetic recording and reproducing device wherein a relatively low frequency signal may be recorded and simultaneously reproduced.

According to this invention, a magnetic recording and reproducing system comprises a means for applying an amplitude modulated high frequency carrier signal to a magnetic transducing device, a magnetic storage medium for traversing said device to demodulate and record the amplitude modulating signal only, and an output circuit means coupled to the device for simultaneous readout of the recorded signal. Additional means, such as a low pass filter, may be provided to attenuate or cancel any spurious component of the high frequency carrier signal in the output circuit so that only the information or amplitude modulating signal is effectively reproduced.

In a particular embodiment of the invention, the transducing device may comprise a plurality of magnetic cores or parts coupled in such manner that the recorded amplitude modulating signal is reinforced for processing by the output circuit, whereas the high frequency carrier signal is cancelled or "bucked out" and therefore does not appear in the output or utilization circuit. Therefore, only the recorded information signal is effectively reproduced in the output circuit for verification or a parity check.

Figure 2:
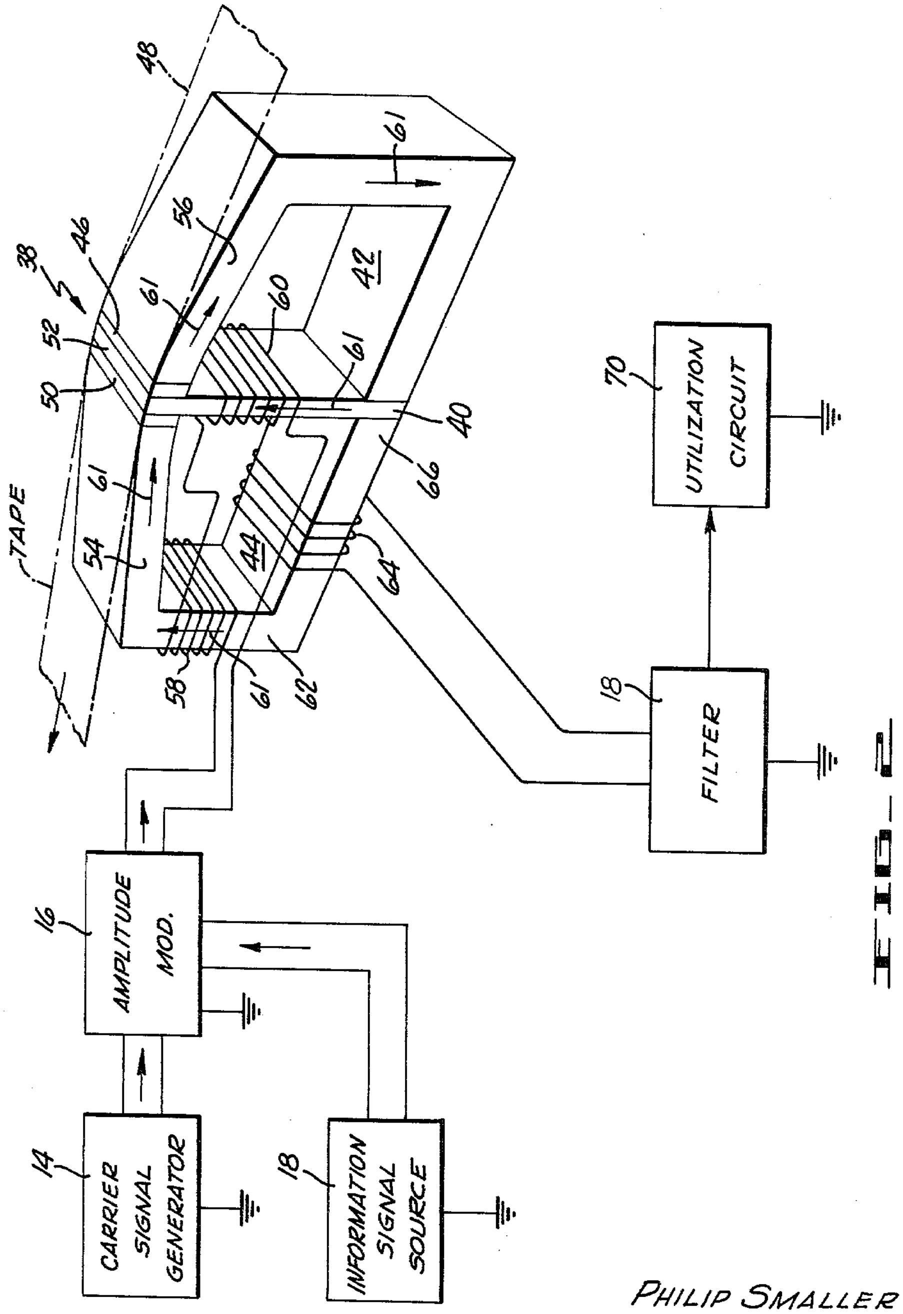
Figure 3:
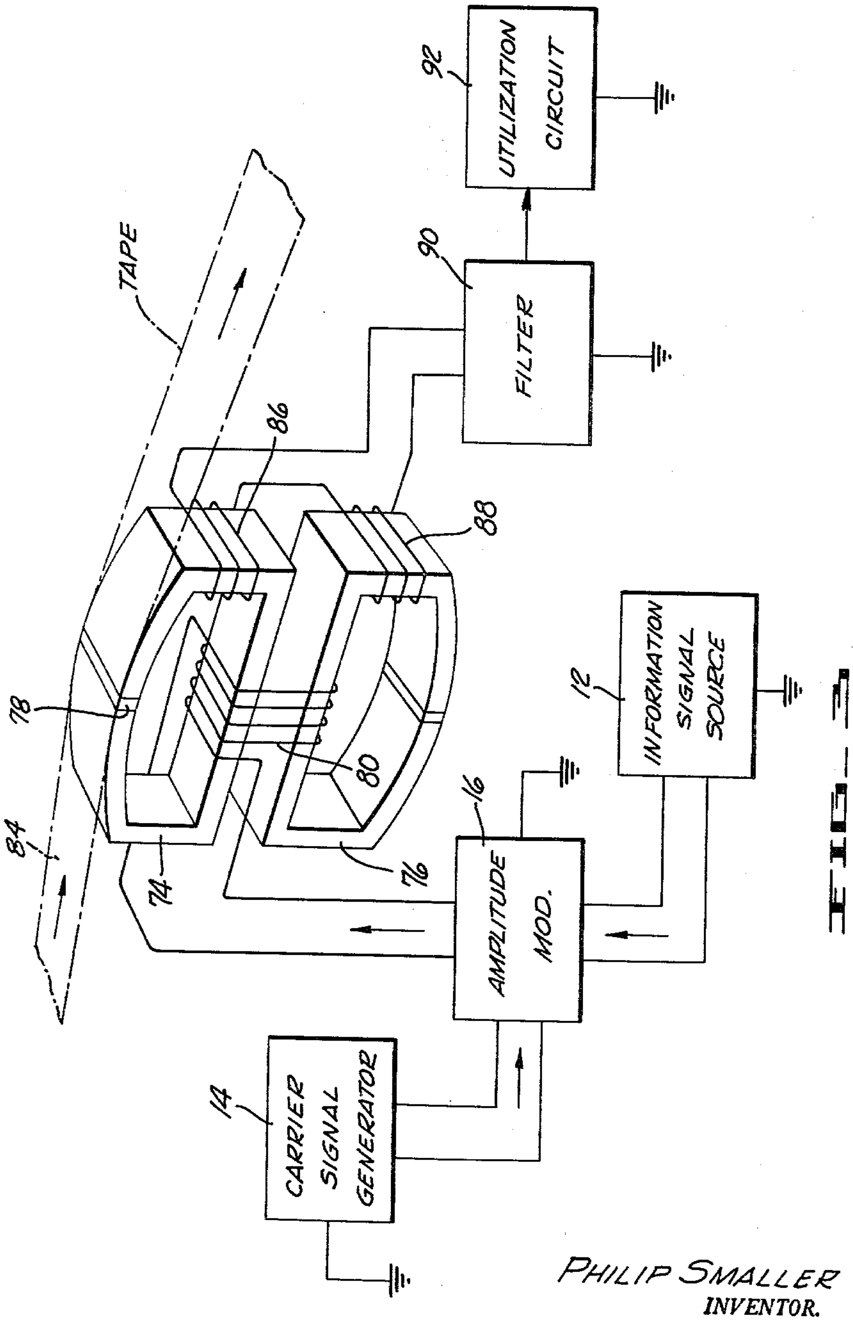

The invention will be described in greater detail with reference to the accompanying drawing, in which:

FIGURE 1 is a schematic and block diagram showing a magnetic recording and reproducing system, in accordance with the invention; and FIGURE 2 and 3 show alternative embodiments of the same invention.

In FIGURE 1, a magnetic transducer 10 comprises a magnetic core 12, which may be formed from Permalloy or Mumetal, or a ferrite core having Alfenol pole tips, for example. A signal generator 14 provides a high frequency carrier wave which is amplitude modulated in a modulator 16 by relatively low frequency information signals, such as an audio frequency signal or pulse signal information, derived from a signal source 18. The amplitude modulated high frequency carrier signal is directed to an input coil 20 coupled to the core 12 thereby causing flux variations in a nonmagnetic transducing gap 22 formed in the core, in a well-known manner. To record the information signal, a magnetic medium or tape 24, which has been previously magnetized to serve as a nonlinear detector, traverses the gap 22 and demodulates the high frequency carrier wave.

With the information signal only recorded on the magnetic tape 24, variations in flux are produced in the transducing gap 22 in accordance with amplitude variations of such recorded signal. The flux variations develop current variations in the core 12, which may be sensed and utilized in an output circuit. For this purpose, and output coil 26 is coupled to the core 12 for channelin such varying current to a utilization circuit 28, wherein the electrical current variations may be utilized for readout of the recorded amplitude modulation signal. However, since the output coil 26 may also receive a portion of the high frequency carrier signal from the input circuit directly through the core 12, a low pass filter 30 is coupled between the output coil 26 and the utilization circuit 28 to cancel or attenuate the undesirable high frequency carrier signal thereby preventing the appearance of any high frequency carrier component in the utilization circuit 28. In this manner, a signal being recorded may be effectively reproduced concurrently with the recording.

In FIGURE 2, another embodiment of the invention includes a magnetic transducing assembly comprising a magnetic core 38 in substantially rectangular form, and an intersecting leg 40 dividing the core 38 into two branches 42 and 44. The first branch 42 serves as a record section, and has a recording gap 46 adjacent to the leg 40 coupled to an input signal providing means for recording an information signal on a magnetic medium or tape 48. The second branch 44 serves as a reproducing section and has a reproducing gap 50 closely spaced from the recording gap 46 by the intersecting leg 40.

As in the embodiment of FIGURE 1, an input signal, which is an amplitude modulated hgh frequency carrier signal derived from a carrier signal generator 14 and information signal source 18 and modulated in a modulator 16, is simultaneously channeled to interconnected coils 58 and 60 coupled respectively to a leg 62 of the reproduce branch 44 and to the intersecting leg 40 common to both branches 42 and 44. The amplitude modulated carrier signal appears in the record branch 42 and develops a flux field at the record gap 46 which varies in accordance with the variations in input signal. Coils 58 and 60 are interconnected in such manner that the direction of the flux fields at any instant during the recording process aid to reinforce the record signal at the record gap 46, while the amplitude of the modulated carrier signal is effectively minimized, at the gap 50 as a result of the opposing flux fields, as shown for the purpose of example by the directional arrows 61 in FIGURE 2.

The magnetic tape 48, which may be magnetically saturated to act as a nonlinear detector, traverses the record gap 46 and demodulates the carrier signal so that the amplitude modulating signal is stored on the magnetic layer of the tape. Therefore, only the recorded amplitude modulating signal on the tape 48 is sensed at the reproduce gap 50 and passed to an output processing means by a coil 64 that is coupled to an arm 66 of the reproduce branch 44. The output signal from the coil 64 is then directed to a low pass filter 68 and to a utilization circuit 70 in a manner similar to that described with reference to FIGURE 1. In this way, it is possible to check the information signal recorded on a magnetic tape substantially simultaneously with the recording thereof.

In FIGURE 3, another embodiment of the invention includes a magnetic transducing assembly having two spaced magnetic cores 74 and 76, both substantially rectangular in form. The core 74 serves as a record-reproduce transducer and has a transducing gap 78. The core 76, which acts as a "bucking" core, is coupled to the transducing core 74 by a coil 80 that receives the input signal or the amplitude modulated high frequency carrier signal. The core 76 is preferably magnetically shielded from the core 74 by proper spacing, or in any other known manner, to prevent crosstalk.

The amplitude modulated high frequency carrier signal, such as utilized in the embodiments of FIGURES 1 and 2, is supplied simultaneously to the cores 74 and 76 from a carrier signal generator 14 and information signal source 18 through a modulator 16 by means of the coil 80. The core 76 is substantially equivalent, electrically and magentically, with the core 74. A pair of output coils 86 and 88 are coupled respectively to cores 74 and 76 and are interconnected in such manner that the voltages induced in each of the coils 86, 88 by the carrier signal applied to coil 80 are in opposition or in antiphase at any given instant. Thus, the modulated carrier input signal is practically negated at the output of the coils 86 and 88.

For additional attenuation of the undesirable carrier signal in the output circuit, a low pass filter 90 may be coupled between the output of the coils 86 and 88 and an output or utilization circuit 92 to prevent any portion of the high frequency carrier signal that may pass from the output of coils 86 and 88 from appearing in the utilization circuit 92.

In operation, as a magnetic tape 84 traverses the transducing gap 78, the tape 84, which has been previously magnetized, demodulates the amplitude modulating signal only on the tape. The recorded signal then appears at the transducing core 74 in the form of magnetic flux that causes a signal current corresponding to its amplitude to be developed in the output coil 86. In this manner, the amplitude modulating information signal may be processed without any spurious high frequency carrier components by the utilization circuit 92 for instantaneous readout.

There has been described herein a novel magnetic transducing assembly wherein recording and playback are provided substantially simultaneously so that verification of the recorded signal may be achieved during the recording process. It is noted that the illustrated systems may employ either a single transducing gap or very closely spaced discrete gaps. It is understood that the invention is not limited only to the embodiments shown herein, but encompasses generally such structures that process a high frequency carrier signal amplitude modulated by a relatively low frequency signal, which is demodulated and recorded by a magnetized storage medium, and then reproduced from the medium practically simultaneously with the recording thereof by means rejecting the high frequency carrier signal.

What is claimed is:

1. A method for simultaneously recording and reproducing an information signal comprising the steps of: applying an amplitude modulated high frequency carrier signal to a transducing device for recording said amplitude modulating information signal only; demodulating and recording such information signal on a magnetic medium which has been magnetized to act as a nonlinear detector; sensing the recorded signal for application to a utilization circuit; and attenuating the high frequency carrier signal to prevent its appearance in the utilization circuit.

2. A magnetic recording and reproducing system comprising: a magnetic transducing device having at least one nonmagnetic gap; an input signal means coupled to said device for providing a high frequency carrier signal modulated by a relatively low frequency information signal; a movable magnetic storage medium for demodulating and recording said information signal at said gap; and an output signal processing means, including a low pass filter coupled to said transducing device for reproducing only said information signal simultaneously with the recording thereof.

3. An apparatus for recording audio frequency signal information onto a movable magentic medium and for instantaneous playback of said signal information comprising: a magnetic transducer having a nonmagnetic gap, an input coil, and an output coil coupled thereto; means for applying a high frequency carrier signal to said input coil, said carrier signal being amplitude modulated by a relatively low frequency information signal; means for transporting said magnetic medium to traverse said gap, said medium being magnetized for demodulating said carrier to record only said low frequency information signal; filter means coupled to said output coil for passing said recorded low frequency signal while suppressing said carrier signal; and a utilization circuit for processing said filtered information signal practically simultaneously with the recording of said information signal.

4. A magnetic transducer assembly for recording an amplitude modulating information signal on a movable magnetized storage medium comprising: a magnetic core having an intersecting leg forming a recording branch and a playback branch, each branch having a nonmagnetic gap closely spaced adjacent to said intersecting leg; a first coil coupled to said intersecting leg and said recording branch; a second coil coupled to a leg of said playback branch, said coils being interconnected so that the magnetic flux in said branches are in opposition at any given instant; means for applying an amplitude modulated high frequency carrier signal to said coils so that said information signal only may be recorded by said storage medium traversing said recording branch gap; an output coil coupled to an arm of said playback branch for passing the recorded signal to an output circuit, including a filter means for suppressing the high frequency carrier signal coupled to said output coil, whereby the information signal is recorded and reproduced substantially simultaneously.

5. A magnetic transducing assembly for recording an information signal and for simultaneous reproduction of said information signal comprising: a first magnetic core having a transducing gap; a second magnetic core having substantially equivalent magnetic and electrical characteristics to said first core; an input coil coupled to said first and second magnetic cores for providing an amplitude modulated high frequency carrier signal to said cores; input means for generating a high frequency carrier signal and for modulating said carrier signal with said information signal coupled to said input coil; a magnetically saturated magnetic tape for traversing said transducing gap to record said information signal only; a first output coil coupled to said first magnetic core for passing the recorded signal to an output circuit; a second output coil coupled to said second magnetic core and connected to said first output coil for cancellation of any component of the carrier signal; a low pass filter means coupled to the output of said first and second output coils for attenuating any high frequency signal that may appear in the output circuit; and a utilization circuit coupled to the output of said filter means for reproducing the recorded information signal simultaneously with the recording thereof.

6. A method for simultaneously recording and reproducing an information signal comprising the steps of: applying a modulated high frequency carrier signal to a magnetic transducing device for recording said modulating information signal only, said device including a single active transducing gap; recording such information signal on a magnetic medium which has been previously magnetized to act as a nonlinear detector; and utilizing the recorded signal for instantaneous playback via said single gap.

7. In a recording system, a recording medium transducer means for recording and reproducing having a single active transducing gap and in transducing relationship with said recording medium, means for applying a signal to be recorded to said transducer means, said means operatively coupled to said transducer; second means for simultaneously detecting said signal actually recorded by said transducer via said single gap, said record means operatively coupled to said transducer means.

References Cited by the Examiner

UNITED STATES PATENTS

| | | | |
|---|---|---|---|
| 1,886,616 | 11/32 | Alverson | 179—100.2 |
| 2,649,506 | 8/53 | Gayford | 179—100.2 |
| 2,722,569 | 11/55 | Loper | 179—100.2 |
| 2,804,499 | 8/57 | Butts | 179—100.2 |
| 2,969,529 | 1/61 | Gilson | 340—174.1 |
| 2,995,631 | 8/61 | Rubens | 179—100.2 |

OTHER REFERENCES

Stewart, W. Earl: Magnetic Recording Techniques, page 30, 1958, McGraw-Hill Book Company, Inc.

IRVING L. SRAGOW, *Primary Examiner.*

NEWTON N. LOVEWELL, BERNARD KONICK, *Examiners.*